No. 791,389. PATENTED MAY 30, 1905.
T. WIDDOP.
HAY FORK.
APPLICATION FILED JULY 19, 1904.
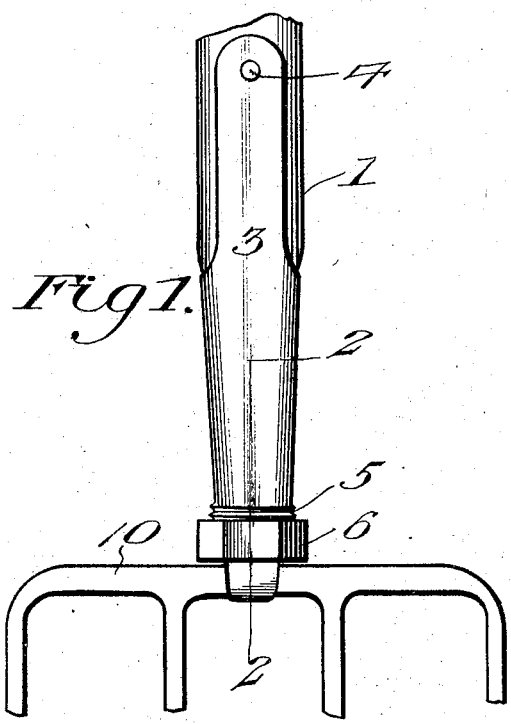
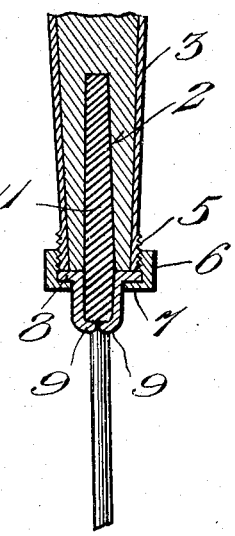
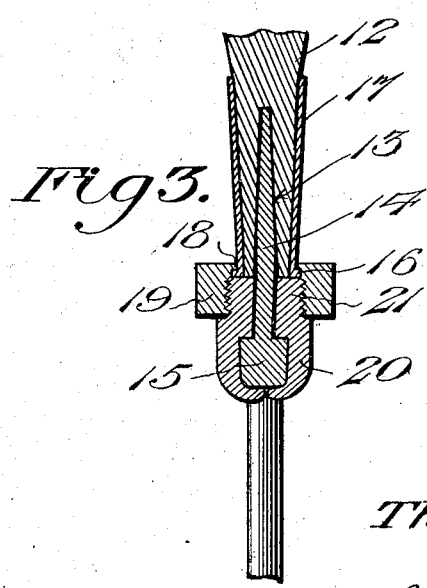
Witnesses
Phil E. Barnes.
Herbert D. Lawson.
Inventor
Thomas Widdop.
By Victor J. Evans
Attorney No. 791,389.

Patented May 30, 1905.

UNITED STATES PATENT OFFICE.

THOMAS WIDDOP, OF MOUNTAINVIEW, WYOMING.

HAY-FORK.

SPECIFICATION forming part of Letters Patent No. 791,389, dated May 30, 1905.

Application filed July 19, 1904. Serial No. 217,277.

*To all whom it may concern:*

Be it known that I, THOMAS WIDDOP, a citizen of the United States, residing at Mountainview, in the county of Uinta and State of Wyoming, have invented new and useful Improvements in Hay-Forks, of which the following is a specification.

My invention relates to new and useful improvements in hay-forks; and its object is to provide means whereby the fork may be firmly secured to the handle thereof and prevented from becoming accidentally detached.

The invention consists of oppositely-disposed claws, which are adapted to grip the head of the fork and which are held firmly clamped upon said head and the shank of the fork by means of a clamping device which engages a ferrule which is permanently secured to the handle.

The invention also consists in the further novel construction and combination of parts hereinafter more fully described, and illustrated in the accompanying drawings, showing the preferred form of my invention, and in which—

Figure 1 is a front elevation of my improved fork-securing device, the same being shown connected to a handle and fork. Fig. 2 is a section on line 2 2, Fig. 1; and Fig. 3 is a view similar to Fig. 2, but showing a modified form of fastening device.

Referring to the figures by numerals of reference, 1 is a handle having a recess 2 in one end, and said end of the handle is inclosed by a ferrule 3, which is permanently secured to the handle 1 by means of a rivet 4 or in any other suitable manner. The outer end of the ferrule is screw-threaded, as shown at 5, and is adapted to project into and engage an internally-screw-threaded nut 6, having an inwardly-extending flange 7, which is adapted to overlap the end of the ferrule and handle. Seated within the nut 6, between the flange 7 and the end of the handle 1, are oppositely-disposed plates 8, from which extend curved claws 9, which are adapted to bear upon opposite sides of the head 10 of a fork and grip the same.

In assembling the parts herein described the shank 11 is inserted through the nut 6, and the plates 8 and claws 9 are also placed within said nut and moved into engagement with the head 10 at a desired point thereon. The shank 11 is then inserted into the recess 2, and the nut 6 is rotated until the plates 8 are firmly clamped against the flange 7 by the adjoining end of ferrule 3. This clamping action upon the plates 8 causes the claws 9 to swing tightly against the head 10, and therefore the parts are firmly secured together, and it becomes impossible to remove the fork until after the nut 6 has been disengaged from the ferrule.

In Fig. 3 I have shown a modified form of securing device. Referring to said figure, it will be seen that the handle 12 thereof has a recess 13, in which is located the shank 14, extending from the head 15 of a fork. An annular flange 16 is arranged at the outer end of a ferrule 17, secured on the handle 12, and mounted on this flange is a flange 18, extending inwardly from an internally-screw-threaded nut 19. Claws 20 are arranged at opposite sides of the head 15 and extend therearound, and these claws have screw-threaded stems 21, which are adapted to be engaged by the nut 19. By turning said nut the claws are drawn upward against the end of the ferrule 17 and the handle 12 and are caused to firmly grip upon the head 15. While I have shown and illustrated these securing devices for use in connection with forks, it will be understood that they may, if desired, be used with rakes, hoes, or any other desired tools.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what I claim as new is—

1. In a device of the class described, a tool-head, a handle, a pair of claws engaging the head, one of said parts being provided with a flange and the other with a screw-threaded portion, and a nut in engagement with said threaded portion and having a flange engaging the first-named flange, said nut being operable for clamping the claws to the handle and head.

2. In a device of the class described, a handle provided with a screw-threaded portion, a tool-head, oppositely-disposed claws engaging said head and provided with projecting flanges, and a nut having a flange engaging the flanges on the claws and in threaded engagement with the threaded portion of the handle.

3. In a device of the class described, a tool-handle, a tool-head, oppositely-disposed claws engaging the head and having flanges, and a coupling member rotatably engaged with the handle and engaged with and operable for clamping the claw-flanges to the handle.

4. In a device of the character described, the combination with a recessed handle, and a screw-threaded ferrule fixedly secured thereto; of a tool-head, a shank extending therefrom and into the recess, a nut engaging the ferrule and having an inwardly-extending flange, plates adapted to be clamped upon the flange and ferrule, and oppositely-disposed claws extending from the plate and engaging the head.

In testimony whereof I affix my signature in presence of two witnesses.

THOMAS WIDDOP.

Witnesses:
ARTHUR L. BURNHAM,
ERICK ERICKSON.